Feb. 20, 1951  E. O. ENGELS ET AL  2,542,239
CAKE DOUGH OR BATTER DEPOSITOR
Filed Dec. 24, 1946  4 Sheets-Sheet 1

INVENTORS.
Eugene O. Engels,
Hans F. Tiedke.
BY
George B. Willcox
ATTORNEY.

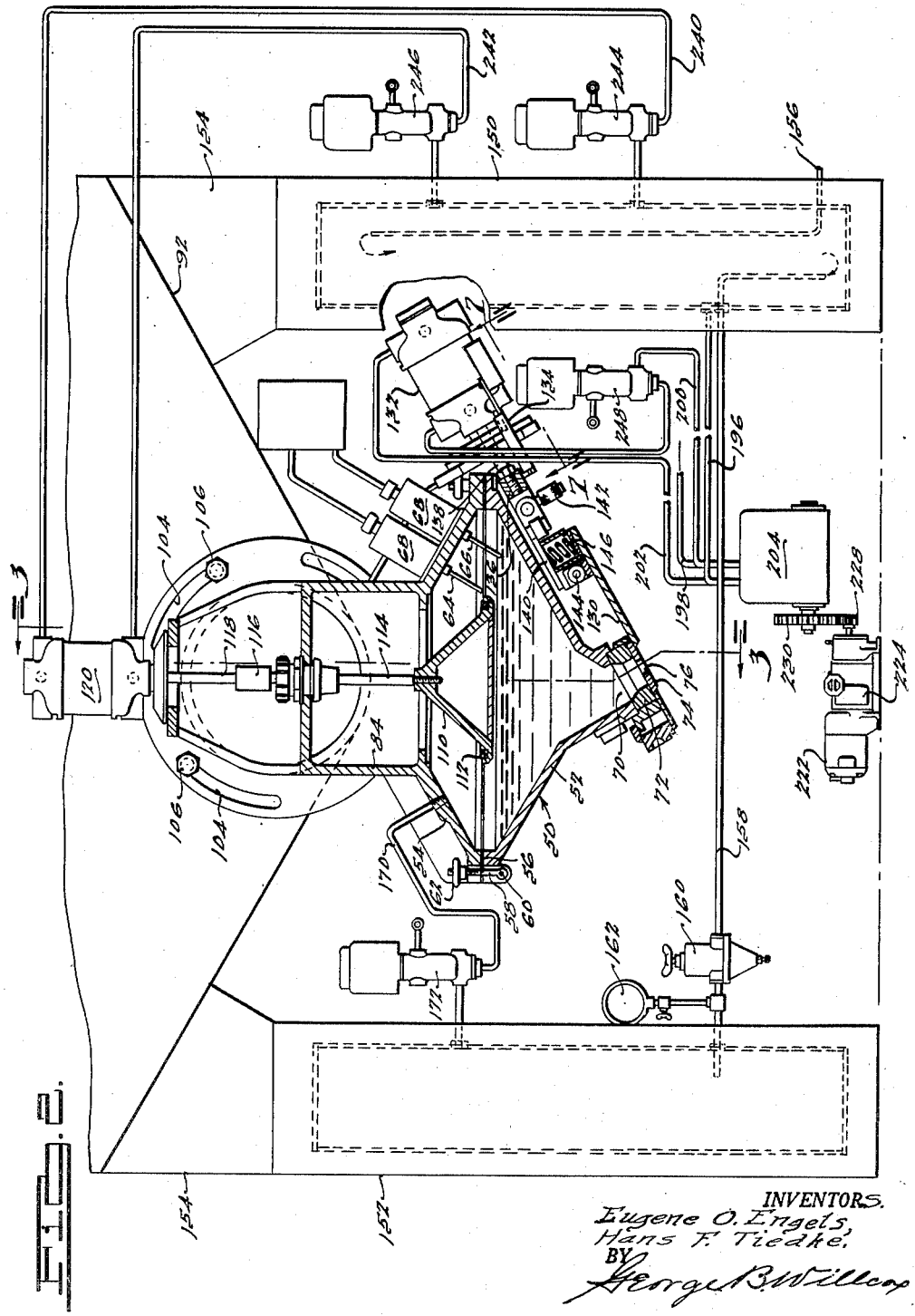

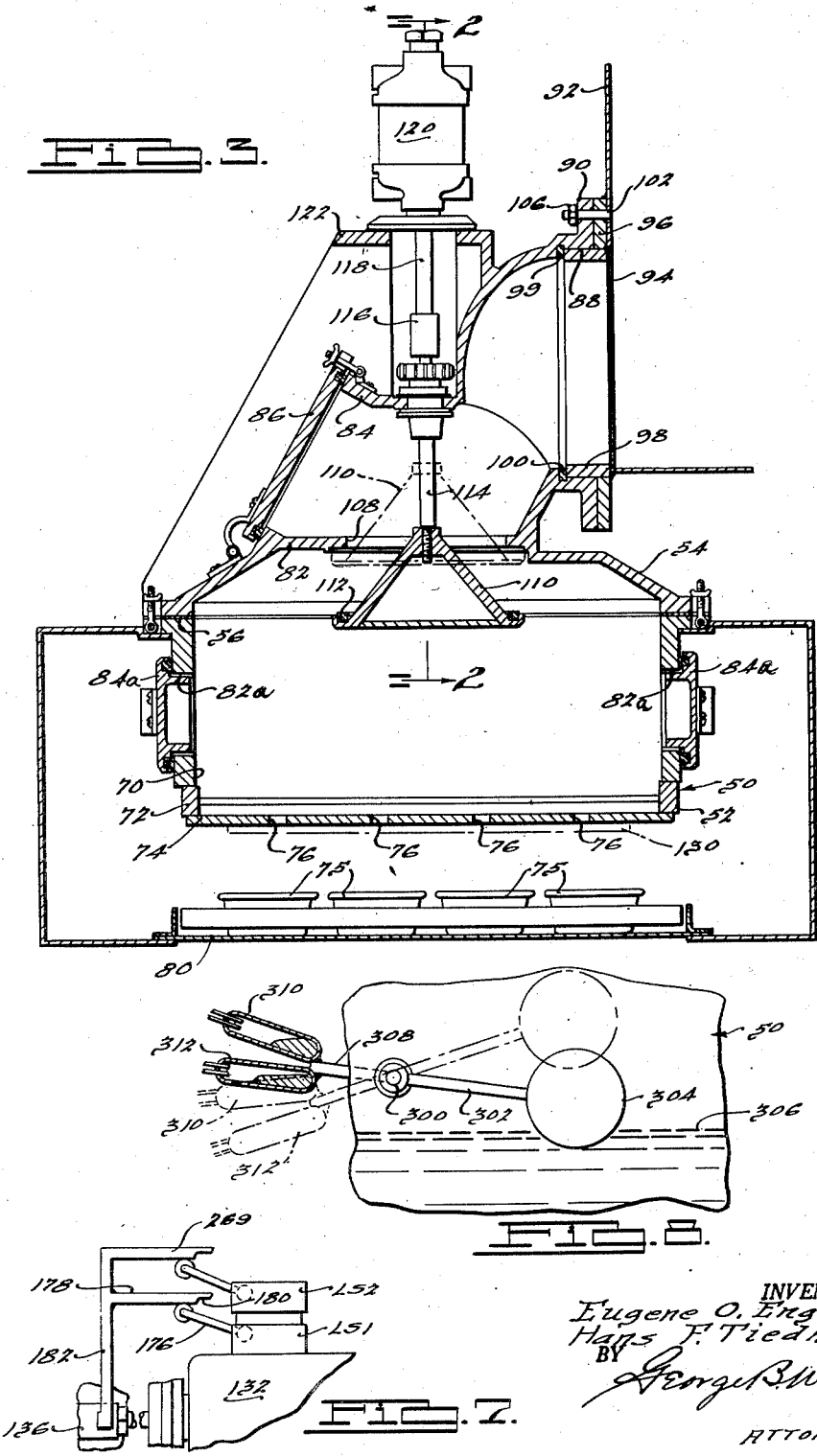

Feb. 20, 1951 E. O. ENGELS ET AL 2,542,239
CAKE DOUGH OR BATTER DEPOSITOR
Filed Dec. 24, 1946 4 Sheets-Sheet 4
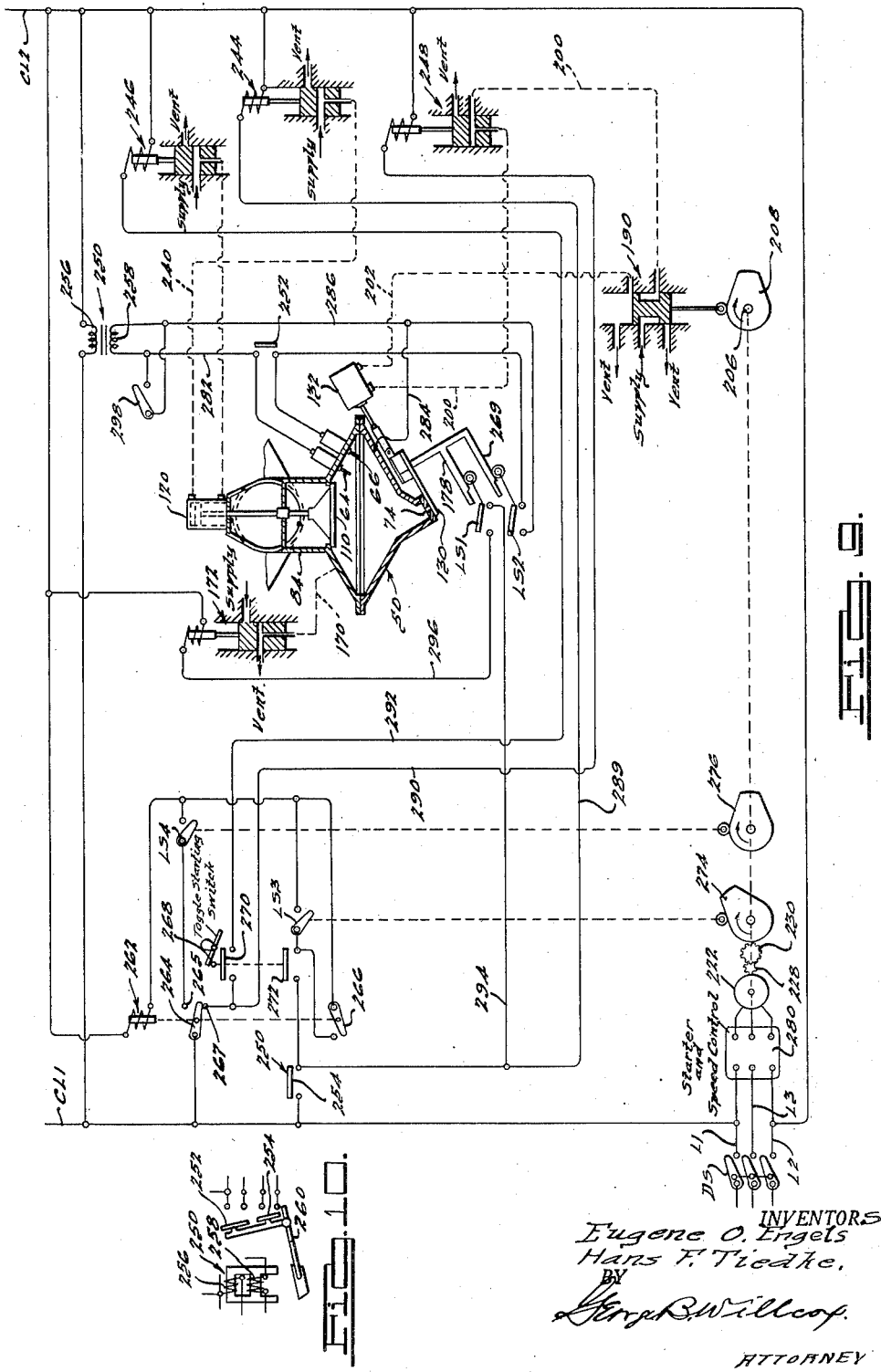
INVENTORS.
Eugene O. Engels
Hans F. Tiedke.
BY
George B. Willcox.
ATTORNEY.

Patented Feb. 20, 1951

2,542,239

UNITED STATES PATENT OFFICE 2,542,239

CAKE DOUGH OR BATTER DEPOSITOR

Eugene O. Engels and Hans F. Tiedke, Saginaw, Mich., assignors to Baker Perkins Inc., Saginaw, Mich., a corporation of New York Application December 24, 1946, Serial No. 718,238

16 Claims. (Cl. 107—29)

The invention relates to what is commonly known in the baking trade as "cake depositors," that is, apparatus into which a mass of cake batter or dough may be introduced and which will discharge the same from the apparatus in pieces, commonly known as "deposits," of predetermined size onto a conveyer belt into pans or other receptacles in which such deposits may be transported and/or baked.

The principal object of the present invention is a provision of a machine or apparatus of the type described that is simple in construction and involves a minimum of mechanically operated parts; that will consistently maintain the weight of the deposits discharged therefrom extremely close to a predetermined weight; that will be fully automatic in operation; and in which those surfaces which come in contact with the dough or batter may be readily and thoroughly cleaned.

Objects of the invention include the provision of apparatus of the character described in which the dough or batter is discharged under air pressure; the provision of apparatus of the type described in which the effect of the static pressure on the dough or batter in the discharge of the same from the apparatus is so controlled as to have little if any material effect in varying the weight of the deposits discharged from the apparatus; the provision of apparatus of the type described in which the deposits are maintained at substantially the same weight, this being accomplished at least in part by maintaining the level of dough or batter in the extrusion chamber of the machine within predetermined limits; the provision of apparatus of the type described in which the extrusion chamber is of such shape and conformation as to provide a maximum horizontal cross-sectional area for that portion thereof located between the levels at which the dough or batter is maintained therein; and the provision of apparatus of the type described in which the level of the dough or batter in the extrusion chamber is maintained between predetermined limits by automatically feeding additional amounts of dough or batter thereto whenever the level of the dough or batter in the pressure chamber reaches a predetermined low level, and automatically discontinuing the feed of dough or batter thereto when the level of the dough or batter reaches a predetermined high level.

Other objects of the invention include the provision of apparatus of the type described in which the feed of dough or batter from the discharge orifice or orifices of the apparatus is interrupted and/or controlled by means of a reciprocable knife which serves the dual purpose of cutting off the dough or batter being discharged from the extrusion chamber to form deposits of the desired weight and also as a valve to close the discharge orifice or orifices between the cut-off periods and at other necessary times which will hereinafter be more apparent; the provision of operative means for controlling the reciprocable position of the cut-off knife; and the provision of a novel mounting for the cut-off knife whereby it may be readily removed for cleaning or the like.

Further objects of the invention include the provision of a novel form of means for controlling the flow of dough or batter to the extrusion chamber of the machine, this including a reservoir mounted upon the extrusion chamber and a valve for controlling the communication therebetween, together with fluid operated means for opening and closing the valve.

Still further objects of the invention include the provision of apparatus of the type described including valve mechanism for controlling the flow of air to the cut-off knife, and to the valve between the reservoir and the extrusion chamber, and control means for the valves including means for maintaining the knife in a position to prevent extrusion of material from the apparatus when the level of the dough or batter in the extrusion chamber reaches a predetermined low level, for relieving the pressure of air in the extrusion chamber at such time, and for opening the valve between the reservoir and the extrusion chamber, and for closing the valve between the reservoir and the extrusion chamber when the level of the dough or batter in the latter reaches a predetermined high level, applying air pressure to the extrusion chamber at such time and automatically initiating reciprocation of the knife; the provision of additional control elements to apparatus of the type last described assuring proper movement of various operating parts of the apparatus and control valves therefor.

The above being among the objects of the present invention, the same consists in certain novel features of construction and combinations and arrangements of parts to be hereinafter described with reference to the accompanying drawings, and then claimed, having the above and other objects in view.

In the accompanying drawings which illustrate a suitable embodiment of the present invention and in which like numerals refer to like parts throughout the several different views.

Fig. 5 (sheet 1) is a transverse sectional view taken on the line 5—5 of Fig. 4;

Figure 4:
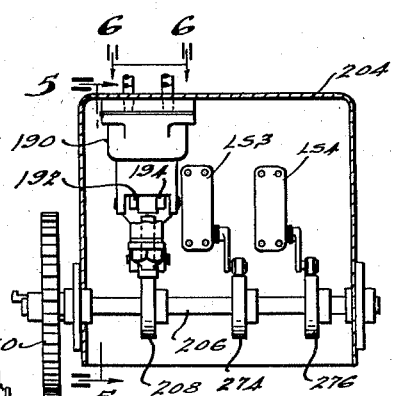
Fig. 4 (sheet 1) is an enlarged view of the motor-driven cam mechanism, shown in the lower portion of Fig. 2, with the face of the control box broken away to illustrate the cams and associated mechanism therein.
Figure 2:
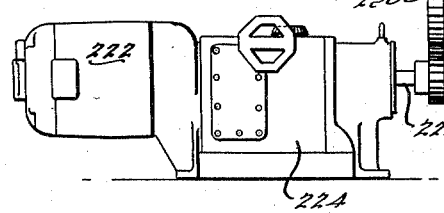
Fig. 2 (sheet 2) is a partially broken vertical sectional view taken centrally through apparatus comprising a preferred embodiment of the present invention, as on the line 2—2 of Fig. 3.
Figure 2:
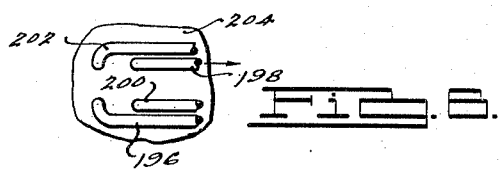

Fig. 6 (sheet 1) is a fragmentary plan view taken on the line 6—6 of Fig. 4 to illustrate the tubes which are connected with the double valve shown in Figs. 4 and 5;

Fig. 7 (sheet 3) is a fragmentary, partially broken, enlarged view taken on the line 7—7 of Fig. 2, showing two of the limit switches which cooperate with the cut-off blade.

Fig. 8 is a fragmentary more-or-less diagrammatic view illustrating a modified form of level controlling switch mechanism; and Fig. 9 is essentially a wiring diagram for the apparatus shown in the preceding figures, part of the apparatus being shown diagrammatically in association therewith in order to better illustrate the relation of parts thereto and allow a better understanding of the same to be had; and Fig. 10 is a diagrammatic representation of one of the relay switch mechanisms actually employed in the wiring of the apparatus and shown as separated parts in Fig. 9.

In bakeries where large quantities of cakes, muffins, and similar types of baked goods are prepared, it is substantially necessary from a commercial standpoint that apparatus be provided which will act upon a relatively large mass of batter or dough to remove portions thereof, commonly referred to as "deposits," of substantially a given weight, and deposit the same in pans traveling below the same on suitable conveyor means. The bulk of such apparatus commercially employed heretofore has been of a type in which the deposits have been cut off from the main mass mechanically and the mechanism has been substantially entirely of a mechanical nature. As a result, such machines, which are commonly referred to as "cake depositors," have been of such character as to require substantial dismantling of the same to expose all those surfaces which have come in contact with the dough or batter during an operation in order to clean such surfaces with any degree of thoroughness. It is possible, and therefore one of the objects of the present invention is thereby attained, to construct an apparatus or machine in accordance with the present invention which readily lends itself to the complete exposing of any surfaces which comes into contact with the dough or batter processed thereby, thus providing such a machine which may be maintained in a sanitary condition with a minimum of time expended in the cleaning operation.

Another difficulty with such machines as heretofore constructed is that the weight of the various deposits, commonly referred to as the "scaling," has varied to an undesirable extent and this difficulty of prior machines may be overcome by a properly designed machine constructed in accordance with the present invention so that the weight of the deposits may be continuously maintained, or scaled, within as little as 1% of the desired predetermined weight.

The overcoming of the two above described disadvantages of conventional cake depositors constitute, perhaps, the main advantages of the present invention, but other advantages are also present. For instance, in a properly constructed machine of the present invention, once it is set in operation all that is required is to maintain the hopper or storage tank at least partially filled with the dough or batter being dispensed, and all the remaining operations are automatically carried out. Thus, a substantially automatic machine is provided which is adapted to operate continuously, the only requirement being that some form of means, whether manual or mechanical, maintain the reservoir sufficiently filled with dough or batter to continue operation of the machine, such operation automatically ceasing shortly after exhaustion of the dough or batter in the reservoir or hopper thereof. Provisions may be made, however, for completely discharging all of the dough or batter from the machine once its automatic operation ceases from lack of a predetermined level of dough or batter in the extrusion chamber thereof.

The apparatus of the present invention employs air pressure for forcefully extruding the dough or batter from the extrusion chamber through one or more discharge orifices and in a position to be acted upon by a cut-off knife to form deposits of equal weight. Broadly speaking, the use of air pressure for this purpose is not in and of itself new, but where the use of air pressure has heretofore been suggested no means have been provided for compensating for the hydrostatic head of the dough or batter which combines with the air pressure employed to extrude the same. For this reason and because of the fact this hydrostatic head varies as each charge of dough or batter is ejected from the machine, the deposits have varied greatly in weight, and such prior machines have therefore been commercially unsatisfactory because of the poor sealing characteristics thereof. This difficulty of prior machines of the air pressure type is overcome in accordance with the present invention by providing means for maintaining the hydrostatic head of the dough or batter in the extrusion chamber within predetermined and relatively narrow limits. In order to aid in overcoming loss of time in frequent charging of the extrusion chamber with an additional batch of dough or batter when the lower level of the same in the extrusion chamber is reached, the extrusion chamber is preferably shaped so as to provide a maximum cross-sectional area in a horizontal plane within the height thereof in which the level of the dough or batter is maintained in operation, such cross-sectional area of the extrusion chamber preferably being reduced above the high level and below the low level points therein, and particularly the latter, in order to minimize the volume of the entire charge in the extrusion chamber.

The bare essentials of the present invention as applied to a machine of the character described are diagrammatically illustrated in Fig. 1, and it is believed that an understanding of the structure diagrammatically illustrated in Fig. 1 will make the succeeding description of the embodiment of the invention shown in later views more readily appreciated and understood. Accordingly, and referring to Fig. 1, the numeral 10 illustrates an extrusion chamber having a discharge spout or nozzle 12 provided with a discharge orifice 14 therein. Except for the orifice 14, which is intermittently uncovered as will hereinafter be explained, and various valve controlled ports and passages leading into the extrusion chamber 10, the latter is of an air-tight construction in which a positive pressure may be built up.

The orifice 14 is alternately opened and closed by a knife blade 16 which reciprocates with its upper surface in contacting relationship with respect to the flat end surface of the spout or nozzle 12, under the influence of a reciprocating mechanism 18 which, in the broader aspects of the invention, may be of any suitable character but which is preferably of the air-operated type and will be so explained.

The dough or batter which is fed to the extrusion chamber 10 and is extruded therefrom and cut off into deposits by the knife 16 is initially fed to a reservoir or hopper 20 positioned above the extrusion chamber 10. The lower end of the receiver or hopper 20 projects down into the upper portion of the extrusion chamber 10 and is sealed thereto against leakage. The flow of the dough or batter from the receiver or hopper 20 to the extrusion chamber 10 is controlled by means of a valve 22 of the poppet type and which is provided with a stem 24 which projects upwardly therefrom and is connected at its upper end with a reciprocating mechanism 26. Here again, in the broader aspects of the invention, the reciprocating mechanism 26 may be of any suitable character but preferably, and as hereinafter described, is of conventional air-operated piston and cylinder type of apparatus.

Air under a suitable pressure is fed through a pipe 28 to a suitably actuated valve 30 and from it may be conducted through a tube or pipe 32 sealed to the extrusion chamber 10 to the interior of the latter. Air may be exhausted from the chamber 10 through a tube or pipe 34 sealed to the chamber 10 and extending to a suitably actuated valve 36 from which it may be exhausted to any suitable point. The valves 30 and 36, in the broader aspects of the invention, may be operated in any suitable manner or by any suitable means but preferably they are operated by solenoids indicated generally at 38 and 40, respectively.

Means are provided, controlled and/or actuated by the level of the batter in the extrusion chamber 10 for controlling the operation of the mechanisms 18 and 26 and the valves 30 and 36. Diagrammatically, this means may consist of a mechanism A and a mechanism B. Broadly speaking, the means which is operated by variations in the level of the dough or batter in the extrusion chamber 10 for controlling the cylinder and piston assemblies 18 and 26 and the valves 30 and 36 may be of any suitable of conventional type. For instance, and particularly where the machine is dispensing batter having a relatively high degree of fluidity, float control means such as indicated in Fig. 8 may be employed, but preferably, and as shown in Fig. 1 and in the actual embodiment of the machine shown mainly in Figs. 2 and 3, a pair of electrodes 42 and 44 are employed, one positioned to make contact and therefore close an electrical circuit therethrough at a predetermined high level of batter or dough in the extrusion chamber 10, which level is indicated by the dotted lines 46, and the other of which is positioned to break an electrical circuit therethrough when the level of the dough or batter in the extrusion chamber has reached a predetermined low level, indicated in Fig. 1 by the dotted lines 48.

The making and breaking of electrical circuits through the electrodes 42 and 44 serves as means to control the operation of the piston and cylinder assemblies 18 and 26 and of the valves 30 and 36. Diagrammatically, as shown in Fig. 1, this may be considered to act through a mechanism indicated generally at A which is actuated by breaking of the circuit through the electrode 44 to energize the solenoid 38 to close the valve 30, to energize the solenoid 40 to open the valve 36, these operations serving to disconnect the extrusion chamber 10 from the source of air pressure and to reduce the pressure of air in the extrusion chamber to atmospheric, to stop the operation of the piston and cylinder assembly 18 with the knife 16 in projected position in which it acts as a valve to close the orifice 14, and to actuate the cylinder and piston assembly 26 to open the valve 22 thereby to permit the dough or batter in the receiver or hopper 20 to flow by gravity or otherwise into the interior of the extrusion chamber 10 to raise the level of the dough or batter in the latter.

The mechanism indicated generally at B may be considered to be activated by closing of an electrical circuit through the electrode 42 when the level of the dough or batter in the extrusion chamber 10 is raised sufficiently to make contact therewith, and the completion of current through the electrode 42 acts through the mechanism B to actuate the piston cylinder assembly 26 to close the valve 22, acts through the solenoid 40 to close the valve 36 and through the solenoid 38 to open the valve 30, and again start the piston and cylinder assembly 18 in operation to effect reciprocation of the knife 16.

Figure 1:
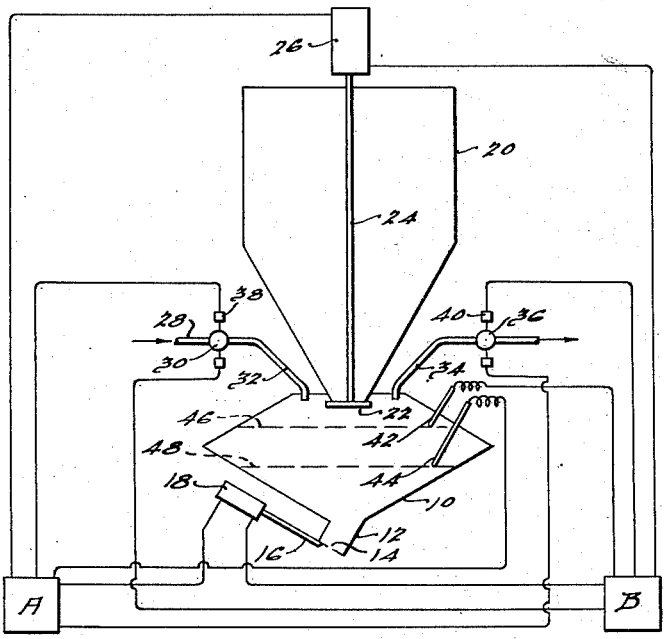
Fig. 1 is a diagrammatic view diagrammatically illustrating the essential parts of the apparatus of the present invention.

It will be thus appreciated from the apparatus disclosed in Fig. 1 and above described, that as long as there is dough or batter in the receiver or hopper 20 to flow into the extrusion chamber 10 upon opening of the valve 22, the electrodes 42 and 44 will control the operating parts of the machine to maintain the level of the dough or batter in the extrusion chamber 10 between the limits indicated at 46 and 48, that the maintenance of the level of the dough or batter in the extrusion chamber 10 is thus automatic, and the machine is continuously and automatically operated to extrude the dough or batter from the orifice 14 and to actuate the knife 16 to cut off the extruded portions of the dough or batter into deposits of predetermined weight. It will also be understood that the amount of variation in the hydrostatic head on the dough or batter in the extrusion chamber 10 between the limits 46 and 48 is so insignificant, when added to the air pressure applied to the extrusion chamber 10 above the dough or batter, that the scaling of the deposits produced by the machine is exceedingly accurate, and, as previously stated, when a machine of the present invention is properly constructed and operated such deposits may be maintained within 1% of a predetermined desired weight.

Figure 3:
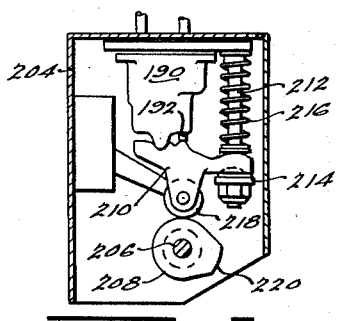
Fig. 3 (sheet 3) is a fragmentary vertical sectional view taken on the line 3—3 of Fig. 2.

Referring now particularly to Figs. 2 and 3, which illustrate a perferred embodiment of the present invention in the form of a commercially workable machine, the extrusion chamber, which is the equivalent of the extrusion chamber 10 of Fig. 1, is here indicated generally at 50 and as including a lower portion 52 and an upper portion 54 removably secured together preferably with the interposition of a gasket 56 capable of rendering the joint between them airtight. Inasmuch as it is desirable to separate the parts or portions 52 and 54 to expose the inner surfaces thereof for cleaning, some form of securing means is preferably employed between the portions 52 and 54 that may be readily released and applied to permit such disassembly and reassembly. While any suitable form of such securing means may be employed, that shown by way of illustration consists of the type in which a bolt such as 58 is pivoted to one of the parts as by means of a pin 60, the two cooperating parts being peripherally slotted for reception of the bolt, and a nut 62 threaded on the free end of the bolt cooperating therewith to clamp the two parts together when the bolt lies in the slots. By simply loosening the nuts 62 and swinging the bolts 58 outwardly about the pivot pins 60, the bottom portion 52 is released from the upper portion 54. It will be observed in Fig. 2 that the extrusion chamber 50 is of the same general cross-sectional conformation as the extrusion chamber 10 of Fig. 1. That is, it is of greatest cross-sectional conformation between the levels defined by the lower ends of the electrodes 64 and 66 which are equivalent to the electrodes 42 and 44 of the diagrammatic representation in Fig. 1. Electrodes 64 and 66 are each mounted in an individual holder 68 suitably secured and sealed to the upper portion 54 of the extrusion chamber and in such manner as to permit them to be conventionally axially adjusted in the holder to vary the high and low levels of the batter in the extrusion chamber 50 at will.

The lower portion 52 of the extrusion chamber 50 terminates at its bottom edge in an elongated opening or slot 70 and a rectangular frame-like member 72 of a commensurate size is suitably secured in sealed relation to the lower face of the portion 52 with its central opening aligned with the slot 70. The lower face of the member 72 is in turn closed by a die plate 74 suitably secured in sealed relation with respect thereto. The die plate 74 is provided with one or more openings through which the dough or batter from the extrusion chamber is extruded to a position to be severed by the knife. While any desired number of openings may be provided in the die plate 74 for extruding the dough or batter therethrough to the pans 75 awaiting therebelow, within the capacity of the apparatus and the positioning of pans to individually receive the deposits, four openings 76 are shown by way of illustration, as brought out in Fig. 3. The individual deposits produce thereby are deposited in individual pans 75 resting upon a conveyor 80 arranged to travel under the die plate 74 in a position to receive the deposits therefrom. It will be understood that the conveyor 80 may be of any suitable or conventional type and that suitable or conventional means are provided which operate in timed relation to the apparatus of the present invention for presenting an empty pan below the die plate 74 for individually receiving a deposit as the latter is cut off by the cut-off knife.

In Fig. 3 the lower portion 52 of the extrusion chamber 50 is shown as being provided with holes 82a in each end thereof which are normally closed and sealed by readily removable covers 84a suitably secured thereto in sealed relation. The covers 84a permit ready inspection and/or cleaning of the interior of the extrusion chamber 50 without necessitating entire removal of such portion from the upper portion.

In the actual embodiment of the machine as shown in Figs. 2 and 3, the receiver or hopper corresponding to the hopper 20 of Fig. 1 is not mounted directly above the extrusion chamber but is mounted to one side thereof for reasons which will hereinafter be explained. Accordingly, the upper portion 54 of the extrusion chamber 50 has integrally formed therewith above the upper wall 82 thereof a chamber 84. The chamber 84 is provided with an opening in one side thereof which, as brought out in Fig. 3, is closed and sealed by a readily removable cover 86 which permits ready inspection and cleaning of the same. The opposite side of the chamber 84 is provided with a circular opening 88 bounded by an annular flange 90. The receiver or hopper, in this case indicated by the numeral 92, is of sheet metal construction with an inclined lower wall at the low point of which on one side thereof it is provided with an opening 94 of substantially the same size as the opening 88 and axially aligned therewith. On the outer face of the receiver 92 a relatively heavy metal ring 96 is secured thereto as by welding or the like in concentric relation with respect to the opening 94, and secured and sealed in the bore of the ring 96 is an outwardly projecting annular collar 98 which is rotatably and relatively closely received in the bore 88. An annular gasket 100 confined between the outer end of the collar 98 and an opposed annular shoulder 99 in the chamber 84 at the inner end of the bore 88 serves to seal the joint between the receiver 92 and the chamber 84. These two parts are secured together by a plurality of studs 102 which are fixed at their inner ends in the ring 96 in parallel relation with respect to the axis of the latter and extend out through circumferentially directed slots 104, as brought out in Fig. 2, in the flange 90 of the chamber member 84, and outwardly of the latter receive nuts 106 thereon. By loosening the nuts 106 the extrusion chamber 50 and parts fixed with respect thereto may be swung about the axis of the sleeve 98 within the limits of movement provided by the studs 102 in the slots 104. This swing of the extrusion chamber is of advantage for two reasons, one of which is that the plane of the die plate 74 may be desirably changed in accordance with the character of the dough, batter or other material being deposited from the extrusion chamber, and the described construction therefore provides for such adjustment. The other reason is that when the lower portion 52 of the extrusion chamber 50 is removed from the upper portion 54 thereof to permit a thorough cleaning operation to be performed on the interior of the extrusion chamber, it is convenient in cleaning out the upper portion 54 to swing it out of a horizontal position and thereby make it more readily accessible and more easily inspected by a workman engaged in such operation, and the ability to swing the extrusion chamber in the manner described permits this advantage to be realized.

The dough or batter in the receiver 92 may flow freely through the collar 98 into the chamber 84, and it is fed from the chamber 84 into the extrusion chamber 50 through an opening 108 in the upper wall 82 of the upper extrusion chamber portion 50. The opening 108 is controlled by a valve 110, corresponding to the valve 22 of the diagrammatic representation in Fig. 1, and its rim underlies the margins of the openings 108 and is provided with an annular sealing gasket 112 in the upper face of such margin adapted to contact the underside of the wall 82 about the margins of the opening 108 when in closed position to seal the joint between the valve and the wall 82. The valve 110 is concentrically mounted upon the lower end of a vertically directed rod 114 which projects up through the upper wall of the chamber 84 to which it is suitably sealed and above which it is connected by means of a coupling 116 with a piston rod 118 of a conventional double-acting piston and cylinder assembly indicated generally at 120 mounted on a bracket 122 formed integrally with the walls of the chamber 84. It will be appreciated that by alternately admitting and exhausting fluid from opposite ends of the assembly 120 the valve 110 may be caused to open and close the opening 108 leading from the receiver 92 into the extrusion chamber 50. The assembly 120 being mounted in fixed relation to the upper portion 54 of the extrusion chamber 50, it will be appreciated that it swings bodily with the latter when the latter is adjusted about the axis of the collar 98, as previously described.

The knife 130, which corresponds to knife 16 of the diagrammatic representation in Fig. 1, is arranged with its upper surface in flat contacting relationship with respect to the lower face of the die plate 74 and is reciprocated by means of a fluid actuated, double acting cylinder and piston assembly 132, the latter of which is mounted on bracket means 134 fixed to the upper portion 54 of the extrusion chamber 50.

In order to mount the knife 130 for operation by the assembly 132 a mounting member 136 is threadably secured to the outer end of the piston rod 138 of the assembly 132 and is formed to removably receive in socketed relation with respect thereto a bracket 140. The bracket 140 is removably secured to the mounting member 136 by means of a readily removable pin 142. The knife 130 is pivotally secured to the bracket 140 by means of a pivot pin 144, and a coil spring 146 maintained under compression between the bracket 140 and the rear end of the knife 130 beyond the pivot pin 144, constantly urges the knife 130 in a counterclockwise direction of movement about the pin 140, as viewed in Fig. 2, thus to press the outer end of the knife 130 upwardly against the flat lower face of the die plate 74.

The use of the spring 146 has two advantages, one of which is that it constantly urges the upper face of the knife 130 into flat contacting relationship with respect to the lower face of the die plate 74 so that when the knife covers the opening 76 the joint between the knife and the die plate is sealed with sufficient firmness to prevent dripping of the dough or batter from between them. Another advantage is that should the pressure in the extrusion chamber 50 applied to the dough or batter therein to extrude it through the opening 76 exceed a safe operating pressure, such pressure acting on the outer end of the knife 130, even though the latter is in overlying relationship with respect to the opening 76 will cause the knife 130 to be pivoted away from the die plate 74 to permit escape of the dough or batter through the opening 76 and thus provide a form of safety valve operable to prevent excessive pressures from being built up in the extrusion chamber.

The assembly comprising the bracket 140, knife 130 and spring 146 is made removable from the mounting member 136 upon removal of the pin 142 so that when it is desired to remove the lower section 52 of the extrusion chamber 50 the knife blade assembly may be removed and therefore placed out of interfering relation with respect to the lower portion 52 when the latter is removed. This is particularly important where, after each run of dough or batter, it is desired to remove the lower portion 52 of the extrusion chamber and thoroughly clean the inner surfaces of the device with which such dough or batter has come in contact.

It will be appreciated that in the broader aspects of the invention whether the assemblies 120 and 132 are operated hydraulically or by air is immaterial. However, inasmuch as it is impossible to apply a liquid medium to the upper surface of the dough or batter in the extrusion chamber to aid in forcing it out of the openings 76 in the die plate 74, air or other inert gas under pressure is therefore required for this purpose. Rather than provide two separate sources of fluid under pressure the assemblies 120 and 132 are preferably operated by air under pressure and air under pressure for application to the dough or batter in the extrusion chamber is obtained from the same source. The air for operating the assemblies 120 and 132 is preferably under much higher pressure than the air which is admitted to the extrusion chamber for extruding the dough or batter therefrom, and furthermore, in order to provide a reserve of such compressed air for both purposes, substantially free from fluctuations of pressures in air lines, air is preferably fed to the assemblies 120 and 132 and to the extrusion chamber 50 from reservoirs. Accordingly one reservoir indicated at 150 is provided for operating the assemblies 120 and 132, and a second reservoir 152 is provided for supplying the extrusion chamber. As brought out in Fig. 2, these reservoirs 150 and 152 are so formed and positioned as to constitute leg structures for the receiver or hopper 92 to which they are connected by brackets 154. In the particular case shown, air is introduced into the receiver 150 under a satisfactorily high pressure from the supply line 156. Air for the receiver 152 is supplied from the receiver 150 by means of a tube or pipe 158 connecting the two and in which a suitable pressure reducing valve 160, preferably of the adjustable type, is operatively connected, a gage such as 162 preferably being provided on the down stream side of the reducing valve 160 so as to permit the pressure maintained within the receiver 152 to be constantly observed.

Instead of using two simple solenoid valves to control the flow of air into and exhaust of air from the extrusion chamber 50 as in the diagrammatic representation in Fig. 1, in actual practice a single three-way solenoid valve is employed for both purposes and this is brought out in Fig. 2. In that figure it will be noted that air is fed into the extrusion chamber from the reservoir 152 by means of a pipe or tube 170, at least a portion of the length of which is flexible so as to permit swinging of the extrusion chamber about the axis of the opening 88 as previously described. Inserted in the tube 170 is a solenoid valve 172 of a conventional three-way type and it is so connected in the tube 170 that when it is energized it opens the tube 170 to the flow of air into the extrusion chamber and when de-energized communicates the interior of the extrusion chamber with the atmosphere to exhaust air therefrom. The valve 172 is controlled by a limit switch LS1 which, as brought out in Fig. 7, is mounted upon the cylinder and piston assembly 132 at one side thereof. The switch LS1 is provided with an operating arm 176 which is engaged by a stepped cam member 178 having a shoulder or rise 180 thereon. The cam member 178 is carried by the bracket 182 which is fixed to the head 136 secured to the piston rod of the cylinder 132 for equal movement therewith. As the piston of cylinder 132 reciprocates the knife 130, it simultaneously reciprocates the bracket 182 and cam 178, causing the outer end of the arm 176 to pass over the shoulder 180 and in doing so moving the switch LS1 between closed circuit and open circuit position. The switch LS1 is of the normally closed type so that as the knife 130 reciprocates to a rear or inoperative position, that is, to the right as viewed in Fig. 2, the free end of the lever 176 drops over the shoulder 180 to close the circuit through the switch LS1, thereby energizing the valve 172 and moving the latter to a position in which air under pressure is admitted to the extrusion chamber 50. The shoulder 180 on the came 178 is preferably so positioned that the switch LS1 is not so opened until the knife 130 is well back on its stroke. Obviously, when the knife 130 reciprocates towards an active position to cut off an extrusion through the opening 76, the free end of the arm 176 passes over the shoulder 180 and opens the circuit through the switch LS1 thereby to de-energize the valve 172 and exhaust the air under pressure in the extrusion chamber to the atmosphere. Inasmuch, as will be hereinafter brought out, as the knife 130 is retained in its retracted position for much longer periods of time than that required to project the knife to operative position and withdraw it to its inoperative position, it will be appreciated from the foregoing that although air under pressure is alternately admitted to and exhausted from the extrusion chamber 50, the latter is maintained under a positive pressure for the greater proportion of time.

The piston and cylinder assembly 132 which controls the operation of the knife 130 is controlled by a suitable timing mechanism which operates to alternately admit and exhaust air from the opposite ends of the assembly. While in the broader aspects of the invention any suitable or conventional timing mechanism may be employed for this purpose, that shown in the accompanying drawings is of a mechanical type in which the valve controlling the admission and exhaust of air from the opposite ends of the assembly 132 is driven by the electric motor, this being particularly advantageous where the motor is of a variable speed type inasmuch as by varying the speed of the motor the size of the deposits may correspondingly be varied. Accordingly, and as best brought out in Figs. 4, 5 and 6, a conventional type of valve 190 is employed to normally control the admission of air under pressure and the exhaust of air alternately from opposite ends of the assembly 132. The valve 190 is of that conventional type provided with two outwardly urged plungers 192 and 194 and is provided with an intake port connected by a tube 196 to the high pressure reservoir 150. It is also provided with an exhaust port shown provided with an exhaust tube 198 through which air may be exhausted to the atmosphere. It is also provided with one port which is connected by a tube 202 to the upper or right hand of the assembly 132, as viewed in Fig. 2, and a second port connected by a tube 200 with the lower or left hand end of the assembly as viewed in Fig. 2. The valve construction is such that when the plungers 192 and 194, which are normally spring pressed downwardly, are in their downward position, the tube 202 is in open communication with the tube 198 and the tube 200 in open communication with the tube 196, thus actuating the assembly 132 to move the knife to its inoperative position. On the other hand if the plungers 192 and 194 are simultaneously actuated upwardly away from their normal position the tube 202 is placed in communication with the tube 196 and the tube 200 in communication with the tube 198, which thereby admits air under pressure to the upper end of the assembly 132 and exhausts it from the lower end thereof, causing the knife 130 to be reciprocated towards its operative position to the left as viewed in Fig. 2, to cut off the extrusions through the openings 76.

To operate the valve 190 to obtain the above described results, the following mechanism is provided. The valve 190 is mounted in a housing 204 suitably mounted in fixed relation with respect to the machine. In spaced relation below the valve 190 a shaft 206 is rotatably mounted in the housing 204. Below the valve 190 the shaft 206 is provided with a cam 208 fixed thereto. A rocker arm 210 within the housing 204 is mounted at one end on the lower end of a vertically extending post or stud 212, the upper end of which is fixed with respect to the housing 204. The cooperating end of the rocker arm 210 surrounds the post 212 and is constantly urged downwardly against an abutment 214 adjustably mounted on the lower end thereof, by means of a coiled compression spring 216 surrounding the stud 212 above the rocker arm. The opposite end of the rocker arm 210 is arranged to substantially contact the lower ends of both plungers 192 and 194 and is provided with a roller 218 which rides on the cam 208.

It will be observed that the high point of the cam 208, indicated at 220, is of an angular extent of approximately 25° to 30°, so it will be appreciated that when the shaft 206 and cam 208 are rotating at a constant rotational speed the plungers 192 and 194 are lifted for only a fraction of the time required for a full rotation of the cam 208. In this respect, the connections between the valve 190 and the assembly 132 are such, as above suggested, that the valve 190 admits air to the upper end of the assembly 132 and exhaust air from the lower end thereof when the plungers 192 and 194 are in their raised position as moved thereto by the high point 220 of the cam 208, and for substantially all of the rest of the full rotational movement of the cam 208 the plungers 192 and 194 are in their lower position in which air is exhausted from the upper end of the assembly 132 and admitted to the lower end thereof, thereby to hold the knife 130 in its retracted position.

The camshaft 206 is rotated by means of a variable speed motor 222 through a suitable gear reducing mechanism 224 directly connected thereto. While the speed reducing mechanism 224, and particularly where its output shaft is rotated at the desired speed of rotation, may be directly secured to the cam shaft 206, in the particular case shown it is assumed that the output shaft 226 of the speed reducing mechanism operates at a speed higher than that desired for cam shaft 206 and, accordingly, is connected thereto through a pair of intermeshing gears 228 and 230 which cooperate to drive the cam shaft 296 at a fractional speed of the shaft 226.

Thus with the construction shown the shaft 206 is driven at a constant speed and during rotation the cam 208 actuates the valve 190 to alternately admit air under pressure to and exhaust air from the opposite ends of the assembly 132, thereby to effect operation of knife 130, and, because of the conformation of the cam 208, that is, with the angularly short high point 220, it will be appreciated that the knife 130 is retained in its retracted position for a materially longer period of time than that required to cause it to reciprocate back and forth through one cycle. It is for this same reason that the valve 172, controlled by the reciprocatory movements of the knife 130, acts to maintain a positive pressure in the extrusion chamber 50 for a greater period of time than during which it acts to connect the interior of the extrusion chamber with the atmosphere, as previously explained.

It has been explained above that by varying the speed of the motor 222 the size and therefore the weight of the deposits extruded and cut off by the knife may be varied. This of course is due to the fact that if the speed of the motor 222 is reduced the time during which the air pressure in the extrusion chamber may act upon the dough or batter therein to extrude through the openings 76 is increased, and vice versa. Such a variation of the speed of the motor effects this result by varying the time element during which the dough or batter being extruded is cut off by the knife 30. It will also be appreciated that for a constant size of opening 76 an equivalent variation may be obtained by varying the pressure of the air acting on the dough or batter, in other words by varying the pressure of the air in the reservoir 152. This, of course, may be accomplished by adjusting the pressure reducing valve 160. Thus either method of varying the scaling of the deposits may be employed, or the die plate 74 may be replaced by one having different sized openings 76 therein.

The piston assembly 120 is actuated by high pressure air from the reservoir 150. This may be accomplished through either a single solenoid operated four-way valve or two solenoid operated three-way valves, the latter being shown by way of illustration for ease of description.

Thus, in order to operate and control the piston assembly 120 which actuates the extrusion chamber loading valve 110, the high pressure reservoir 150 is connected by a line of pipe or tubing 240 with the upper end of the assembly 120, and by a line of pipe or tubing 242 with the lower end of the assembly 120. In order to control the flow of air through the line 240 a solenoid operated valve 244 is interposed therein, and in order to control the flow of air through the line 242 a solenoid operated valve 246 is inserted therein. The valves 244 and 246 are conventional three-way valves of the solenoid operated type which when de-energized provide open communication between the two sections of the pipe in which they are located, and when energized connect that section of the pipe between it and the assembly 120 with the atmosphere and close that section of the line connecting it with the reservoir 150. The energizing and de-energizing of the valves 244 and 246 is controlled in a manner which will be hereinafter described in connection with the wiring diagram of the machine.

A solenoid operated three-way valve 248 is also inserted in the line 200 connecting the valve 190 to the lower end of the piston and cylinder assembly 132. The valve 248, like the solenoid valves previously described, is of the normally open type, that is, open when de-energized, and when open provides open communication with the two sections of the line 200 which it connects, and when energized connects the part of the line 200 between it and the assembly 132 with the atmosphere. This valve is so controlled, as will hereinafter be more fully explained, that when the control system for the machine is actuated to open the valve 110 by means of the assembly 120, the lower end of the assembly 132 is opened to the atmosphere thus to insure the knife 130 being in its fully projected position wherein it covers the ports 76 in the dies plate 74, thus to prevent extrusion of the dough or batter through the ports 76 during recharging of the extrusion chamber 50 with dough or batter.

Referring now to Figure 9, which illustrates the electrical and air control circuits, the extrusion chamber 50 is shown in outline, and the valves 172, 190, 244, 246, and 248 are shown diagrammatically, all of these valves being shown in their lowermost positions, corresponding to the illustrated position of the cam 208 associated with valve 190, and corresponding to the de-energized conditions of the solenoids associated with the other valves.

The illustrated electrical control system comprises an induction relay 250, which is provided with a pair of normally open contacts 252 and 254. The primary and secondary windings of relay 250 are shown remotely from the associated contacts, in Figure 9, the mechanical relation between these elements being indicated in Figure 10. Relay 250 responds to the level of the batter within the extrusion chamber, serving to automatically initiate an unloading or extruding operation when the level of the batter reaches the previously mentioned upper electrode 64, and serving to initiate a charging operation as a consequence of the fall of the batter level to a point below the position of the previously mentioned lower electrode 66. Since, as discussed in more detail below, the control current for relay 250 passes, in the present embodiment, through the batter, it is desired to utilize a relay which is responsive to a very low value of control current. For this reason the illustrated induction type relay proves to be very satisfactory.

Referring briefly to Figure 10, relay 250, which is of a commercially available type, one form of which is marketed by the B and W Controller Company of Birmingham, Michigan, comprises a magnetic core structure which carries a continuously energized primary winding 256, and an intermittently energized secondary winding 258 which is disposed in inductive relation to the winding 256. So long as the circuit of the secondary winding 258 is interrupted, the flux produced by the primary winding 256 passes through the upper and central legs of the core structure, little or none of such flux being directed through the armature 260. Completion of the circuit for the secondary winding 258 establishes a magnetic field which passes through the armature 260 and across the air gap between the armature 260 and the core structure, thereby causing the armature 260 to be drawn upwardly into engagement with the core structure, closing the contacts 252 and 254, and holding them closed so long as both primary and secondary circuits are complete.

A normally closed limit switch LS2 cooperates, as described below, with electrodes 64 and 66 to control the secondary winding 258 of relay 250. Switch LS2 is controlled by a cam 269 (Fig. 7) which is so shaped that switch LS2 is closed except while the knife 130 is in a completely, or substantially, closed position.

In addition to the induction relay 250, the illustrated control system also comprises a usual electromagnetic relay 262, which is provided with a contact 264, disposed for engagement with either one of a pair of upper and lower fixed terminals 265 and 267 depending upon the energized or deenergized condition of the relay. Relay 262 also comprises a second normally open movable contact 266. When de-energized, relay 262 occupies the illustrated position.

Relay 262 is controlled by a double pole starting and stopping switch 268, and by a pair of limit switches LS3 and LS4. Switch 268 may be and preferably is of the toggle type, and is provided with normally open contacts 270 and 272. Limit switches LS3 and LS4 are operated by associated cams 274 and 276, carried by the previously mentioned control shaft 206. As is described in more detail below, limit switch LS4 serves to insure proper operation of the knife at the end of each extruding operation. It is preferred that cam 276 have a raised or dwell portion which is substantially aligned with that of cam 208, whereby switch LS4 is closed shortly after cam 208 lifts valve 190, and is reopened shortly after cam 208 relowers valve 190. Limit switch LS3 serves to initiate the operation of relay 262 and, while the raised or dwell portion of its cam 274 may be randomly positioned with respect to cams 208 and 276, it is preferred that switch LS3 be closed shortly after switch LS4 is reopened. The raised or dwell portion of cam 274 may have only a small angular span, since only a momentary closure of limit switch LS3 is required.

It is believed that any remaining mechanical and electrical details of the system may best be understood from a description of the operation as a whole.

Considering such operation, the parts are shown in Figure 9 in the positions occupied thereby when the usual disconnect switch DS is open, thereby de-energizing all electrical circuits. To condition the system for operation, the disconnect switch may be closed, energizing the control conductors CL1 and CL2, and rendering the timing motor 222 subject to control by the starting and speed control device indicated diagrammatically at 280.

Energization of line conductors CL1 and CL2 completes an obvious energizing circuit for the primary winding 256 of the induction relay 250. For purposes of the present description, it may be assumed that the batter is at a level within the extrusion chamber, which is suitable for the initiation of an extruding operation. Under these conditions, as previously described, the end of the upper electrode 64 is in engagement with the upper surface of the batter, thereby completing an energizing circuit for the secondary winding 258 of relay 250, which circuit extends through conductor 282, electrode 64, the batter, the metallic frame of the extrusion chamber 50, and thence through the conductors 284 and 286, back through the secondary winding 258. In response to the completion of this circuit, relay 250 closes its two contacts 252 and 254. Closure of contact 252 completes a maintaining circuit for the secondary winding 258, which extends through the lower electrode 66, and thence through the batter and conductors 284 and 286. It will be appreciated that so long as this circuit is maintained, relay 250 will occupy the closed or energized position, even though, during the course of the extruding operation described below, the level of the batter falls below the position of electrode 64.

Closure of the other induction relay contact 254 completes an obvious energizing circuit, through conductor 289, for the coil of valve 244, which thereupon assumes its upper position, venting the space above the piston of cylinder 120. Under the conditions stated, valve 246 is de-energized, and applies pressure to the underside of the piston cylinder 120, thereby maintaining the filling valve 110 in the closed position.

Energization of line conductors CL1 and CL2 also serves to energize valve 248, through now closed contacts 264-267 of relay 262, causing this valve to lift and complete a continuous venting circuit for the underside of the piston of cylinder 132, thereby preventing an opening movement of knife 130.

To further condition the system for operation, the starter and speed control device 280 may be actuated to place the motor 222 in operation at a desired speed. As will be evident, this action causes intermittent opening and closing of the limit switches LS3 and LS4, which action is without effect, in view of the now open condition of the starting switch 268. The operation of the motor also causes an intermittent lifting of valve 190. Each such lifting operation connects the upper end of cylinder 132 to the source of supply, through line 292, and each lowering operation vents such upper end of cylinder 132. Under the conditions mentioned, however, valve 248 is energized and consequently serves to continuously vent to atmosphere the lower end of cylinder 132. Consequently, the operation of valve 190 is without effect upon knife 130 which remains in the closed position. It will be appreciated, accordingly, that closure of the disconnect switch serves, in this instance, only to condition the system for an automatic extruding operation.

To initiate an extruding operation, the toggle switch 268 may be moved to the closed position, thereby closing its contacts 270 and 272. Closure of contact 272 prepares a circuit for energizing the winding of relay 262, which circuit is completed the next time cam 274 momentarily closes limit switch LS3. The completed circuit extends from line conductor CL1 through the now closed contacts 254 of the induction relay 250, contact 272, limit switch LS3, and thence through the coil of relay 262 to line conductor CL2. Upon being energized, relay 262 moves to its upper position, closing contact 266, bringing contact 264 into engagement with its upper associated fixed terminal 265, and disconnecting terminal 267.

Closure of contact 266 completes a holding circuit for relay 262, in parallel with limit switch LS3, rendering the intermittent opening and closing of limit switch LS3 ineffective. It will be noted that this maintaining circuit for relay 262 remains complete throughout the extruding operation about to be described.

The disconnection of the lower fixed terminal 267 disconnects conductors 290 and 292 from the source of supply, thereby interrupting the energizing circuits for valves 248 and 246. So long as valve 248 is de-energized, as described above, it cannot affect the periodic operations of the knife 130, and so long as valve 246 is de-energized, it serves to continuously maintain pressure below the piston of cylinder 120, thereby positively maintaining the filling valve 110 in the closed position during the extruding period. It will be appreciated that the momentary energization of the winding of valve 246, occasioned by the closure of toggle switch contacts 270 before the disconnection of terminal 267, is transitory only and does not call a false movement of valve 110.

Closure of contacts 264—265, of relay 262, prepares an auxiliary maintaining circuit for relay 262, the purpose of which is described below.

With cam 208 in the illustrated position, the de-energization of valve 248 immediately initiates an extruding operation. More particularly, with valves 248 and 190 in the illustrated lower positions, the lower end of cylinder 132 is supplied with pressure through line 200, and the upper end thereof is vented through line 202. Consequently, knife 130 is promptly retracted, exposing the discharge openings 74. The retracting movement of knife 130 also permits both of the illustrated limit switches LS1 and LS2 to close. Limit switch LS2 completes an auxiliary maintaining circuit for the induction relay 250, the purpose of which is described below, and closure of limit switch LS1 completes an obvious energizing circuit (through induction relay contacts 254 and conductors 294 and 296), for the winding of the extruding valve 172. Upon completion of this circuit, valve 172 moves to the open position, connecting the interior of the extruding chamber to the source of pressure, through line 170. Under the influence of the pressure thus introduced into the extruding chamber, the batter or dough contained therein is caused to move through the discharge openings 74.

As the timing shaft 206 continues to rotate, cam 208 lifts valve 190, reversing the air connections for cylinder 132 and causing knife 130 to rapidly move to the closed position, cutting off the extruded deposit. At an intermediate stage of the closing movement of knife 130, limit switch LS1 is re-opened and, very near the end of such closing movement of knife 130, limit switch LS2 is re-opened. The operation of limit switch LS2 is described below. The re-opening of limit switch LS1 de-energizes extruding valve 172, again venting the interior of the extruding chamber, and preventing the building up of an undesirable pressure against the batter during the time that the knife 130 is in the closed position.

After a comparatively short period, determined by the dwell of cam 208, valve 190 again resumes its lower position, reversing the connections for cylinder 132 and again causing the knife 130 to move to the open position. This opening movement again re-closes the limit switches LS1 and LS2, limit switch LS1 again serving to operate valve 172 and admit extruding air into the interior of the extruding chamber. When valve 190 is next raised by cam 208, another cut off movement of knife 130 takes place and valve 172 is again operated to vent the interior of the extruding chamber.

It is believed to be evident that so long as relays 250 and 262 are maintained in the energized position, and so long as the level of the batter remains high enough for extruding operations, the intermittent operations of valve 190 causes corresponding extruding and cut-off actions, the interior of the extruding chamber being under extruding pressure (valve 172) during each extruding action, and being vented to the atmosphere while the knife 130 is closed as an incident to each cut-off operation. Intermittent operations of cam 208, during this continuous extruding operation, are, of course, accompanied by intermittent operations of cams 274 and 276, and corresponding operations of limit switches LS3 and LS4. As will be evident, these intermittent operations of limit switches LS3 and LS4 are without effect upon the extruding operation.

As the extruding operation progresses, the level of the batter in the extruding chamber gradually falls, and ultimately reaches a level in which the lower electrode 66 is out of contact with the batter. This action does not immediately de-energize the induction relay 250, and terminate the extruding operation, but it does render relay 250 subject to the position of the knife 130. More particularly, the disconnection of terminal 66 interrupts the initially traced maintaining circuit for the secondary winding of induction relay 250. On the other hand, a parallel maintaining circuit for winding 258 is maintained through limit switch LS2 except when the knife 130 is in the closed position. Consequently, the first closing movement of knife 130 after the disconnection of holding electrode 66, by opening limit switch LS2, interrupts all connections for the induction relay winding 258, thereby de-energizing the latter, and automatically initiating a charging operation.

Upon the de-energization of winding 258, induction relay 250 resumes the de-energized position, opening both of its contacts 252 and 254. The opening of contact 252 is without immediate effect, since both of electrodes 64 and 66 are now exposed, and limit switch LS2 is now open, but does render a re-energization of winding 258 subject to a re-immersion of electrode 64, which takes place only at the conclusion of the charging operation. The opening of contact 254 is without immediate effect, but does render the circuits initially completed thereby subject to the condition of relay 262.

It will be recalled that switch LS4 is closed while valve 190 is raised and remains closed for an interval (long enough to insure the making of a full retracting stroke by knife 130) after cam 208 lowers valve 190. At the time in question, accordingly, limit switch LS4 is closed and completes a maintaining circuit for the winding of relay 262, through relay contacts 264—265. Additionally, relay contacts 264—265 and limit switch LS4 complete, through relay contact 266 and toggle switch contact 272, a circuit which directly shunts induction relay contact 254, which shunt circuit maintains valve 244 in the energized position, and also renders the valve 172 subject to limit switch LS1.

When cam 208 lowers valve 190, the air connections for cylinder and piston assembly 132 are again reversed, causing the knife 130 to move to the retracted position. This movement again recloses limit switches LS1 and LS2, the latter being without effect. Reclosure of limit switch LS1 re-energizes valve 172 admitting extruding pressure to the chamber 50 and initiating another extrusion.

Shortly after knife 130 attains the retracted position, cam 276 reopens limit switch LS4, interrupting the sole remaining energizing circuit for relay 262, which thereupon resumes the illustrated normal position. The re-engagement of relay contacts 264—267 completes energizing circuits through conductors 290 and 292 for valves 248 and 246. Upon being energized, valve 248 completes a venting circuit for the under side of the piston of cylinder 132, which action is without immediate effect since at the time in question the space above this piston is also vented through valve 190. The energization of valve 246 vents the space beneath the piston in cylinder 120, preparatory to an opening movement of the filling valve 110. The separation of relay contacts 264—265 de-energizes conductors 291 and 294, which, respectively, de-energizes valves 244 and 172. Upon being de-energized, valve 244 assumes the illustrated position, applying pressure to the space in cylinder 120 above its piston, and causing the filling valve 110 to open. The de-energization of valve 172 vents the interior of the extrusion chamber 50, so that the final extrusion now in progress is made without full benefit of the normal extruding pressure.

When next cam 208 raises valve 190, the supply pipe 202 is again connected to the source of pressure and knife 130 is caused to move to the closed position, reopening both limit switches LS1 and LS2 without effect. The closing movement of the knife 130 cuts off the final deposit, and closes off the extrusion chamber.

The reclosure of limit switch LS4 which takes place about the same time as the last-mentioned lifting movement of valve 190 is, of course, without effect, in view of the now open condition of relay 262. As the filling operation continues, the timing motor shaft 206 may make one or more additional complete revolutions, all without effect upon the position of the knife 130, in view of the now de-energized condition of valve 248.

As the filling operation progresses, the batter reaches a level at which electrode 66 is immersed therein. This action is without effect in view of the now open condition of induction relay contacts 252. On the other hand, when the batter again reaches a level at which the upper electrode 64 is immersed therein, the original energizing circuit for the secondary winding 258 of the induction relay is again completed, causing this relay to again move to the energized position, closing its contacts 252 and 254. As before, contacts 252 complete a maintaining circuit for the secondary winding 258 which remains complete so long as the lower electrode 66 is immersed in the batter. As before, reclosure of induction relay contact 254 immediately re-energizes valve 244, again venting the space above the piston in cylinder 120, this action being preparatory to the reclosing movement of the filling valve 110.

Also, the reclosure of induction relay contact 254 prepares a re-energizing circuit for relay 262, which is completed the next time limit switch LS3 closes. Upon being energized, relay 262 functions as before (by disconnecting terminal 267) to de-energize valves 246 and 248. The de-energization of valve 246 again admits air under pressure to the underside of the piston in cylinder 120, causing a prompt reclosure of filling valve 110. Similarly, the de-energization of valve 248 again renders the cylinder 132, associated with knife 130, subject to the periodic operations of valve 190. It will be noticed that in view of the angular displacement between cams 274 and 208, the energization of relay 262 and the consequent de-energization of valves 246 and 248 always takes place at a time when valve 190 is in its lower position. In this position, valve 190 completes connections for cylinder 132 which retract the knife 130. Consequently, the energization of relay 262, which takes place at the conclusion of a refilling operation, causes an immediate retraction of the knife and a consequent immediate start of the extruding operation. In order that the thus initiated first extrusion may take as long as later ones in series, it will be appreciated that it is desirable to so position cam 274 that it closes relay 262 very shortly after cam 276 reopens limit switch LS4. This relationship is indicated in Fig. 9, in which the cams are assumed to be rotating in the counterclockwise direction indicated by the arrows thereon.

It is believed to be evident that the extruding operation thus initiated by the completion of the refilling of the extrusion chamber, continues as described in connection with the first extruding operation until the first time following the separation of the batter from the lower electrode 66, that knife 130 recloses. Such first reclosure of knife 130, as before, by opening limit switch LS2, interrupts all energizing circuits for the secondary winding 258 of the induction relay, thereby de-energizing the latter and initiating another refilling operation.

So long, therefore, as the timing motor 222 remains in operation, and the starting and stopping toggle switch 268 remains closed, the present machine functions automatically to provide successive alternate extruding and refilling operations, each extruding operation comprising a series of individual extrusions.

The present machine may, of course, be stopped at any stage of an extruding operation, simply by reopening the toggle switch 268. This action, at contact 270, makes a second interruption in the circuit for valve 246, insuring that pressure will continue to be introduced below the piston of cylinder 120, thereby maintaining the filling valve 110 in the closed position. The opening of toggle switch contacts 272 is without immediate effect except that it does render the energizing circuit for relay 262 subject to limit switch LS4. It will be appreciated that it is desirable that an interruption of an extruding operation, effected by opening the toggle switch 268 shall, as in the case of an automatically terminated extruding operation, controlled by the batter level, take place when the knife 130 is in a fully closed position. It will be appreciated also that the opening of toggle switch 268 may take place either at a time while valve 190 occupies the illustrated lower position, or at a time when it occupies the upper position.

In the former instance, the opening of toggle switch contact 272 immediately interrupts the energizing circuit for relay 262, since limit switch LS4 is open at the time in question and since the parallel connected contacts 266 and limit switch LS3 are subject to contacts 272. The de-energization of relay 262, by again connecting contacts 264-267, immediately re-energizes valve 248, which thereupon completes a continuous venting circuit for the underside of the piston of cylinder 132. At the time in question, the upper side of the piston of cylinder 132 is vented through valve 190. However, when cam 208 next raises valve 190, the upper side of the piston of cylinder 132 is connected to the source of pressure causing an immediate reclosing movement of the knife 130. Thereafter, as before, intermittent operations of valve 190 are without effect upon the knife 130, in view of the venting connection afforded by valve 248. Thus, the interruption of the extruding operation initiated by the random opening of toggle switch 272 does not interfere with an extrusion then in progress, but does interrupt the extruding operation at the conclusion of such individual extrusion. The final deposit of such an interrupted extending operation is thus of standard size.

If, on the other hand, the opening of switch 268 takes place while valve 190 is in the raised position, knife 130 will already be closed.

There is, of course, a short interval between the time cam 208 lowers valve 190, thereby completing retracting circuits for cylinder 132, and the time the retracting movement of the knife is completed. If valve 248 should be de-energized during this period, it will be appreciated that the consequent venting of the underside of the piston of cylinder 132 might interrupt the movement of knife 130 at an intermediate point in its stroke, leaving the outlet of the extrusion chamber in a partially open condition until cam 208 had made substantially a complete revolution and had again raised valve 190, and caused a closing movement of the knife 130. Such a condition would, of course, be undesirable in that it would permit the forming of a final deposit of substandard size. In the present system, limit switch LS4 serves to prevent a stoppage of knife 130 in an intermediate position. It will be recalled that limit switch LS4 closes at or about the time that valve 190 is lifted, and reopens at the expiration of a short period after valve 190 resumes its illustrated lower position; and that this short period is just long enough to permit a full retracting movement of knife 130.

Consequently, in the event switch 268 is opened while valve 190 is elevated, such opening of contact 272 is preparatory only, since relay 262 is maintained in an energized condition through limit switch LS4 and maintaining contacts 264—265. When, thereafter, cam 208 lowers valve 190, circuits are completed for retracting knife 130. Very shortly after this retracting movement is completed, limit switch LS4 reopens, interrupting the just-mentioned holding circuit for relay 262 and causing the re-energization, at contacts 264—267, of valve 248. As before, valve 248 vents the space beneath the piston of cylinder 132, which action is without effect since at the time in question the other side of the piston is also vented. Consequently, a normal extrusion takes place, at the conclusion of which, valve 190 is again elevated, applying air to the upper portion of cylinder 132 and causing a closing and cutting off movement of the knife.

It will be seen, therefore, that if toggle switch 268 is open during the course of an extrusion, such extrusion is completed and the extruding operation is interrupted when the extrusion in question is cut off by the closing movement of knife 130. Similarly, if switch 268 is opened at any other time (that is, while valve 190 is lifted) such opening is preparatory only and permits one final deposit to be made. In either event, the knife 130 is finally stopped in the fully closed position. It is believed to be clear that a reclosure of the starting switch 268, following such an interruption of an extruding operation, serves merely to restart the interrupted extruding operation and permit completion thereof in the normal manner.

In shutting down the machine, it is, of course, desirable to provide for a complete emptying of the extrusion chamber. In accordance with the present invention, this may be effected by temporarily closing the manually operated emptying switch 298, which completes a circuit for the secondary winding 258 of the induction relay, which is independent of the above described normal circuits therefor. It will be appreciated, accordingly, that if switch 298 is closed during the course of an extruding operation, such operation is not interrupted as a consequence of the exposure of electrode 66, but instead continues until the extrusion chamber is completely emptied.

After the extrusion chamber has been completely emptied, toggle switch 268 may be opened, stopping further reciprocating movements of the knife 130, as described above, and leaving this knife in its fully closed position. At any time thereafter, the emptying switch 298 may be opened, thereby de-energizing induction relay 250, and restoring all of the illustrated electrical circuits to the condition shown in Fig. 9. If, after such reopening of switches 268 and 298, motor 222 remains in operation, it causes only ineffective operations of limit switches LS3 and LS4 and correspondingly ineffective operations of valve 190.

Reference has heretofore been made to Fig. 8 as illustrating a form of mechanism controlled by the level of the dough or batter in the extruding chamber 50 which may be employed for the same purpose and in place of the electrodes 64 and 66, this particularly where the dough or batter being operated upon is of a more or less readily flowable character. As illustrated in Fig. 8, a shaft 300 is projected through and is rotatable in a wall of extrusion chamber 50 and is suitably sealed against leakage thereto. Within the extrusion chamber 50, the shaft has fixed thereto one end of an arm 302 to the opposite end of which a float 304 is secured so that the vertical position of the float 304 corresponds with the level of the dough or batter 306 in the extrusion chamber 50. Exteriorly of the extrusion chamber 50 an arm or lever 308 is fixed at one end to the shaft 300 and at its opposite end carries a pair of mercury switches 310 and 312, respectively. One terminal of each of the switches 310 and 312 may be grounded and the other terminals thereof connected in the same circuits as the electrodes 64 and 66, respectively, previously described. It will be observed that when the float is raised to the dotted position corresponding to the high level of dough or batter desired in extrusion chamber 50, the switch 310, which functions in the same manner as the electrode 64, closes, and therefore will effect the same result as when the level of the dough or batter in the previously described construction contacts the lower end of the electrode 64. The contacts for the switch 312 are closed at this time and are only opened when the level of the dough or batter in the extrusion chamber 50 reaches the position shown in full lines, or shortly therebefore, corresponding to the low level of the dough or batter desired in the extrusion chamber, and therefore has the same effect as breaking the circuit through the electrode 66 upon a similar condition being obtained in the first described construction. It will be understood that the disclosure in Fig. 8 is simply illustrative of one of several different forms of mechanism which may be employed to control the previously described circuits, one of which is closed when the electrode 64 is contacted upon the presence of a predetermined high level of dough or batter in the extrusion chamber and the other of which is broken when the electrode 66 is uncovered when the level of the dough or batter in the extrusion chamber falls to a predetermined low level therein.

Formal changes may be made in the specific embodiment of the invention described without departing from the spirit or substance of the

What is claimed is:

1. In a device of the type described, in combination, an extrusion chamber having a discharge opening therein, a cut-off knife mounted for reciprocable association with said discharge opening and operable when in one limit of its reciprocable position to uncover such opening for the discharge of material from said chamber therethrough and operable when in the opposite limit of its reciprocable position to seal said opening against the discharge of material therethrough, said knife being operative in passing from the first mentioned reciprocable position to the last mentioned reciprocable position to cut off material extruded through said opening during the period in which said opening is uncovered by said knife, a source for supplying material to said chamber, a valve controlling communication with said source and said chamber, means for opening and closing said valve, means for selectively introducing air under pressure to said chamber and for venting said chamber to the atmosphere, means for reciprocating said knife, control means connected to said reciprocating means and actuated by a predetermined low level of material in said extrusion chamber to maintain said knife in said second position of reciprocation thereof, means connected to said pressure means and responsive to the second named position of said knife for operating said pressure means to vent said chamber to the atmosphere, means for opening said valve closing and opening means to supply material to said chamber and means responsive to a predetermined high level of material in said chamber for closing said valve opening and closing means and for operating said reciprocating means to operate said knife to uncover said opening, said operating means for said pressure means being actuated to communicate air under pressure to said chamber.

2. In apparatus of the type described, in combination, an extrusion chamber having a discharge opening therein for the discharge of material therefrom, a knife reciprocably associated with said extrusion chamber operative when at one limit of its reciprocable position to uncover said opening for the discharge of material therethrough and operative when at the opposite extreme of its reciprocable position to close said opening to the discharge of material therethrough, means for reciprocating said knife, and means connected with said reciprocating means and including an actuator disposed within said chamber and operable by material in said chamber when said material has reached a predetermined low level therein and said knife has reached the second mentioned limit of its reciprocable position to make said reciprocating means ineffective and thereby maintain said knife in such second position until said material in said extrusion chamber has been built up to a predetermined high level.

3. In apparatus of the type described, in combination, an extrusion chamber having a discharge opening therein, means for alternately opening and closing said discharge opening, a source of material to be supplied to said extrusion chamber, valvular means selectively operable to admit air under pressure from a pressure source to said extrusion chamber and to vent said chamber to atmosphere, valvular means controlling communication between said source of supply and said extrusion chamber, and means including an actuator disposed within said extrusion chamber operable by material at a predetermined level in said extrusion chamber to control the position of both said valvular means whereby to vent said extrusion chamber to atmosphere when the second mentioned valvular means is opened.

4. In apparatus of the type described, in combination, an extrusion chamber having a discharge opening therein, means for alternately opening and closing said discharge opening, a source of material supply for said extrusion chamber, valvular means controlling communication between said source of supply and said extrusion chamber, means including an actuator disposed within said extrusion chamber operable by material at a predetermined level in said extrusion chamber to control the position of said valve, means for operating and maintaining said first mentioned means to a position to close said discharge opening, said control means actuating said operating means whenever said valve is opened to effect communication between said source and said extrusion chamber.

5. In apparatus of the type described, in combination, an extrusion chamber having a discharge opening therein, a reciprocable knife associated with said discharge chamber operable when in one position to close said opening to the discharge of material therethrough and operative when in another position to open said opening for the discharge of material therethrough, fluid pressure operated means operative to reciprocate said knife between said positions, means for applying fluid pressure to the said material in said extrusion chamber, a common source of fluid under pressure connected to both of said means, and means in the connection between the last mentioned applying means and said source operable to deliver fluid under pressure to said extrusion chamber at a lower pressure than the fluid delivered to said knife reciprocating means.

6. In apparatus of the type described, in combination, a material chamber having a discharge opening therein, cyclically operated discharge control means to open and close said opening, a source of material supply for said chamber connected for communication with said chamber, means for opening communication between said source and said chamber to supply the latter with material from said source and adapted for closing said communication, control means including an actuator within said chamber and operable by material in said chamber at a predetermined level; for said discharge control means rendering the latter effective to permit discharge through said opening so long as said material in said chamber is above a predetermined level therein, and means connected to said second control means and means for opening communication between said source and said chamber, including an actuator disposed within said chamber effective when said material in said chamber falls below said predetermined level for maintaining said discharge control means in position to close said opening and for opening communication between said source and said chamber.

7. In apparatus of the type described, in combination, a material chamber having a discharge opening therein, cyclically operated discharge control means to open and close said opening, a source of material supply for said chamber connected for communication with said chamber, means for opening communication between said source and said chamber to supply the latter with material from said source and adapted for closing said communication, and control mechanism including an actuator disposed within said chamber and operable by a predetermined high level of material in said chamber for actuating said means for opening communication between said source and said chamber to close communication between said source and said chamber, said control mechanism including further control means operable when said actuator is operated in response to said predetermined high level for rendering said discharge control means effective to permit a discharge of material through said opening.

8. In apparatus of the type described, in combination, a material chamber having a discharge opening therein, cyclically operated discharge control means to open and close said opening, a source of material supply for said chamber connected for communication with said chamber, means for opening communication between said source and said chamber to supply the latter with material from said source and adapted for closing said communication, and control mechanism including an actuator disposed in said chamber and operable by a predetermined high level of material in said chamber for actuating said means for opening communication between source and said chamber to close communication between said source and said chamber, said control mechanism including further control means operable when said actuator is operated in response to said predetermined high level for rendering said discharge control means effective to permit a discharge of material through said opening and including additional control means operable when said actuator is operated in response to a predetermined low level of material in said chamber to maintain said discharge control means in a position to close said opening and to operate said communication means to open communication between said source and said chamber.

9. In apparatus of the type described, in combination, a material chamber having a discharge opening therein through which said material is adapted to be discharged, a member movably associated with said opening operable when in one position to open said opening to the discharge of material therethrough and when in another position to seal said opening against the discharge of material therethrough, means for moving said member between said two positions, cyclically operated means controlling the operation of said moving means, a source of material supply connected with said chamber, a valve between said source of supply and said chamber controlling communication therebetween, means for moving said valve between closed and open positions, means controlled by the level of material in said chamber for controlling said valve moving means, and means controlled by the position of said member rendering the last mentioned means ineffective to open said valve when said member is in any position other than the second mentioned position thereof.

10. In apparatus of the type described, in combination, a material chamber having a discharge opening therein through which said material is adapted to be discharged, a member movably associated with said opening operable when in one position to open said opening to the discharge of material therethrough and when in another position to seal said opening against the discharge of material therethrough, means for moving said member between said two positions, cyclically operated means controlling the operation of said moving means, a source of material supply connected with said chamber, a valve between said source of supply and said chamber controlling communication therebetween, means for moving said valve between closed and open position, means controlled by the level of material in said chamber for controlling said valve moving means, and means controlled by the position of said member rendering the last mentioned means ineffective to open said valve when said member is in any position other than the second mentioned position thereof, means controlled by the presence of a predetermined high level of material in said chamber for closing said valve, said last-named means rendering said cyclically operated means inoperative to resume control of said member moving means until said cyclically operated means is in a predetermined position in its cycle.

11. In apparatus of the type described, in combination, an extrusion chamber having an opening therein for the extrusion of material therefrom, a knife member movably associated with said opening operable when in one position to close said opening to the flow of material therethrough and uncovering said opening to the flow of material therethrough when in another position, means for cyclically moving said member between said two positions, means for selectively admitting to and exhausting air from said extrusion chamber, a source of material supply connected to said extrusion chamber, a valve controlling communication between said source of supply and said extrusion chamber, means controlled by the level of material in said extrusion chamber for opening and closing said valve, means controlled by the position of said knife member controlling said air admission and exhausting means, means controlled by the position of said member rendering said valve operating means ineffective to open said valve except when said member is in the first mentioned position thereof, and means operable with the opening of said valve for rendering said knife member moving means inoperative to move said member.

12. In apparatus of the type described, in combination, an extrusion chamber having a discharge opening therein, a knife member reciprocably associated with said extrusion chamber operable when at one limit of its reciprocable movement to open said opening to the discharge of material therethrough and when in the opposite limit of its reciprocable movement to seal said opening against the discharge of material therefrom, means for reciprocating said knife member, valvular means for selectively admitting air under pressure to said extrusion chamber and for venting said chamber to atmosphere, means controlled by the position of said knife member controlling said valvular means, a source of material supply connected with said extrusion chamber, a valve controlling communication between said source and said chamber, means for opening and closing said valve, means controlled by the level of material in said extrusion chamber for controlling the valve opening and closing means, cyclically operated means controlling said knife member moving means, means controlled by the position of said knife member rendering said level controlled means inoperative to open said valve except when said knife member is in the second mentioned position thereof, and means operated in timed relation with said cyclically operated means operable upon initiation of operation of said apparatus to operate said knife reciprocating means.

13. In apparatus of the type described, in combination, an extrusion chamber having a discharge opening therein for the ejection of material therefrom, a member movably associated with said extrusion chamber operable when in one limit of its movable position to close said discharge opening against the discharge of material therethrough and when in the opposite limit of its movable position to open said opening to the discharge of material therethrough, electrically operated valvular means for admitting air under pressure to said extrusion chamber and exhaustion of air therefrom, a source of material supply connected to said extrusion chamber, a valve between said source and said extrusion chamber controlling communication therebetween, fluid pressure operated means for moving said valve between closed and open positions, electrically operated valvular means for controlling said valve moving means, means operated by a variation of level of material in said extrusion chamber operable to control the second mentioned electrically operated valvular means to operate said valve moving means to open said valve upon said material in said extrusion chamber reaching a predetermined low level and to open the circuit to the first mentioned valvular means to exhaust air from said extrusion chamber simultaneously therewith, and switch means operated between open and closed circuit position during movement of said member between its said two limits of movement rendering said level control means inoperative to open said valve and to exhaust air from said extrusion chamber until said member is in the last mentioned of its said positions.

14. In apparatus of the type described, in combination, an extrusion chamber having a discharge opening therein for the ejection of material therefrom, a member movably associated with said extrusion chamber operable when in one limit of its movable position to close said discharge opening against the discharge of material therethrough and when in the opposite limit of its movable position to open said opening to the discharge of material therethrough, electrically operated valvular means for admitting air under pressure to said extrusion chamber and exhaustion of air therefrom, a source of material supply connected to said extrusion chamber, a valve between said source and said extrusion chamber controlling communication therebetween, fluid pressure operated means for moving said valve between closed and open positions, electrically operated valvular means for controlling said valve moving means, means operated by a variation of level of material in said extrusion chamber operable to control the second mentioned electrically operated valvular means to operate said valve moving means to open said valve upon said material in said extrusion chamber reaching a predetermined low level and to open the circuit to the first mentioned valvular means to exhaust air from said extrusion chamber simultaneously therewith, switch means operated between open and closed circuit position during movement of said member between its said two limits of movement rendering said level control means inoperative to open said valve and to exhaust air from said extrusion chamber until said member is in the last mentioned of its said positions, and means for rendering the last mentioned control means inoperative when it is desired to eject all of said material from said extrusion chamber.

15. In apparatus of the type described, in combination, an extrusion chamber having an opening therein for the ejection of material therethrough, a knife member reciprocably associated with said extrusion chamber acting when in one of its reciprocable positions to close said opening to the flow of material therethrough and when in the other of said reciprocable positions opening said opening to the ejection of material therethrough, a fluid operated piston and cylinder assembly connected to said knife for effecting operation thereof, a source of fluid under pressure connected to said piston and cylinder assembly, valve mechanism in said connection operable when in one position to introduce fluid under pressure to one end of said cylinder and piston assembly and exhaust fluid from the opposite end thereof and when in another position to admit fluid under pressure to the last mentioned end and exhaust fluid from the first mentioned end thereof, rotatable cam means arranged to cyclically operate said valve mechanism, a source of fluid under pressure connected to said extrusion chamber, valvular means in the last mentioned connection operable when in one position to connect the last mentioned source with said extrusion chamber and when in another position to connect said extrusion chamber to the atmosphere and disconnect it from said second source, and means operated in timed relation to said knife member for actuating said valvular means between said two positions, the last mentioned means acting to move said valvular means to connect said extrusion chamber with the atmosphere when said knife is in the first mentioned position thereof, and to open said source to said extrusion chamber when said knife is in the second mentioned position thereof.

16. In a cake depositor, in combination, an extrusion chamber having a discharge opening in a lower portion thereof, a movable knife member cooperating with said opening acting to seal said opening to the discharge of material therethrough when in one of its movable positions and acting to open said opening to the discharge of material therethrough when in another of its positions, means for moving said knife member from one of its positions to another of said positions, means mounting said extrusion chamber for oscillatory movement about a horizontal axis, a material supply passage for said extrusion chamber opening on said axis, valvular means controlling communication between said supply passage and the interior of said extrusion chamber, and a fixed supply chamber having a discharge opening on said axis rotatably associated with said passage and sealed with respect thereto.

EUGENE O. ENGELS.
HANS F. TIEDKE.

REFERENCES CITED

The following references are of record in the file of this patent:

UNITED STATES PATENTS

| Number | Name | Date |
|---|---|---|
| 2,159,726 | Laggard | May 23, 1939 |
| 2,223,352 | De Francisci | Dec. 3, 1940 |
| 2,246,758 | Roth | June 24, 1941 |
| 2,273,595 | Roth | Feb. 17, 1942 |
| 2,276,382 | Francis | Mar. 17, 1942 |
| 2,317,897 | Ellis | Apr. 27, 1943 |
| 2,339,291 | Paulus | Jan. 18, 1944 |